(12) United States Patent
Donastorg

(10) Patent No.: US 6,488,217 B1
(45) Date of Patent: Dec. 3, 2002

(54) ANTI-HYDROPLANE SYSTEM FOR TIRES

(76) Inventor: Anthony A. Donastorg, 3808 SW. 70th Ave., Miramar, FL (US) 33023

( * ) Notice: Subject to any disclaimer, the term of this patent is extended or adjusted under 35 U.S.C. 154(b) by 0 days.

(21) Appl. No.: 09/797,155

(22) Filed: Mar. 1, 2001

(51) Int. Cl.⁷ .................................................. B05B 1/24
(52) U.S. Cl. ...................... 239/131; 239/130; 239/135; 239/172; 239/413; 239/428; 280/757; 180/271; 291/2; 291/46; 291/3
(58) Field of Search ................................. 239/130, 131, 239/135, 172, 413, 428, 417.5; 280/757; 180/271; 291/2, 3, 19, 20, 23, 24, 46

(56) References Cited

U.S. PATENT DOCUMENTS

| | | | |
|---|---|---|---|
| 2,896,246 A | 7/1959 | Wildt | |
| 3,041,748 A | 7/1962 | Wetzel | 37/19 |
| 3,228,125 A | 1/1966 | Wiebe | 37/12 |
| 3,544,370 A | 12/1970 | Wrede | 134/37 |
| 3,680,885 A | 8/1972 | DeCardi et al. | 280/150 R |
| 4,063,606 A | * 12/1977 | Makinson | 180/271 |
| 4,324,307 A | * 4/1982 | Schittino et al. | 126/271.1 |
| 4,848,510 A | * 7/1989 | Ahmed | 180/309 |
| 5,100,175 A | * 3/1992 | Swallow et al. | 239/567 |
| 5,273,315 A | 12/1993 | Debus | 280/762 |
| 5,350,035 A | * 9/1994 | Bodier et al. | 180/197 |
| 6,371,532 B1 | * 4/2002 | Skarie et al. | 291/2 |

* cited by examiner

Primary Examiner—Henry C. Yuen
Assistant Examiner—Christopher Kim
(74) Attorney, Agent, or Firm—Joseph N. Breaux

(57) ABSTRACT

An anti-hydroplane system for tires that includes a blower assembly in front of each of the tires of a vehicle. Each blower assembly discharges a high pressure stream into a water dispersal area in front of a respective one of the vehicle tires.

1 Claim, 5 Drawing Sheets

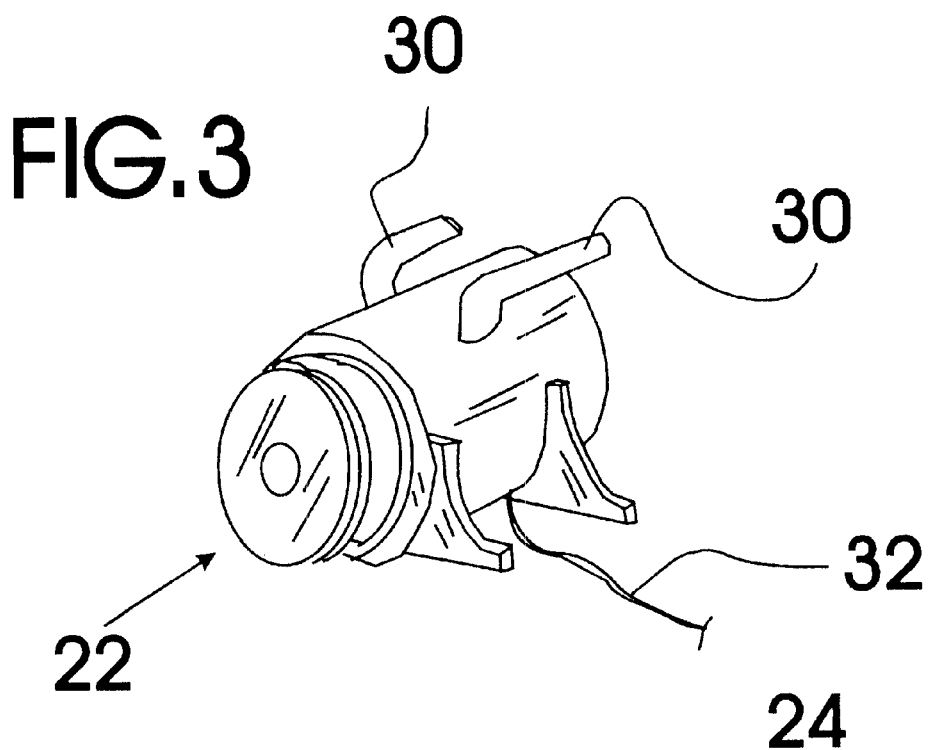
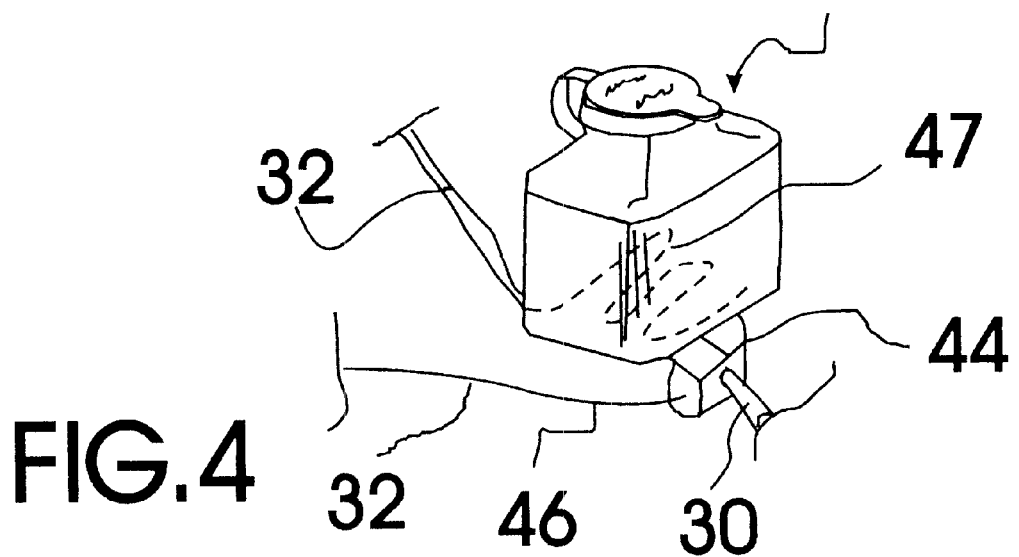

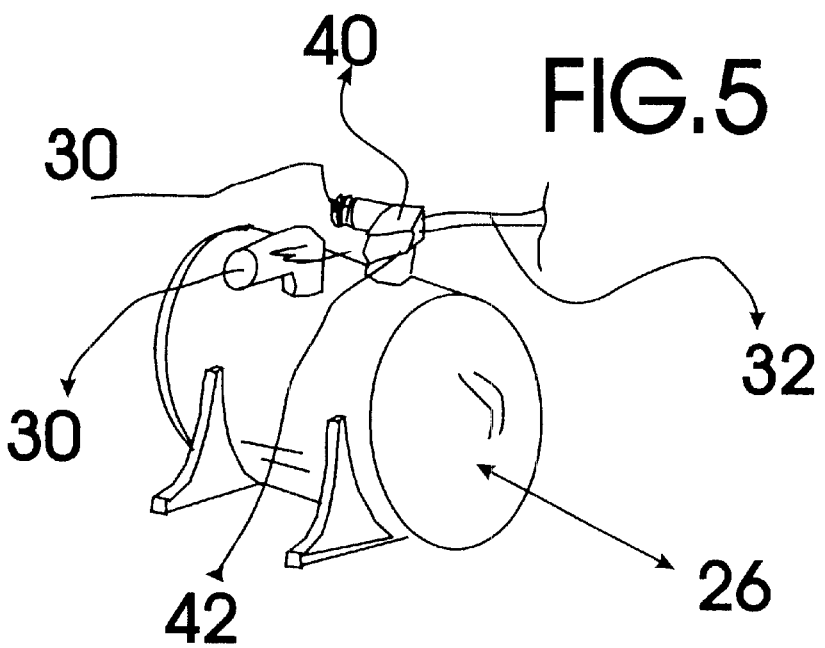
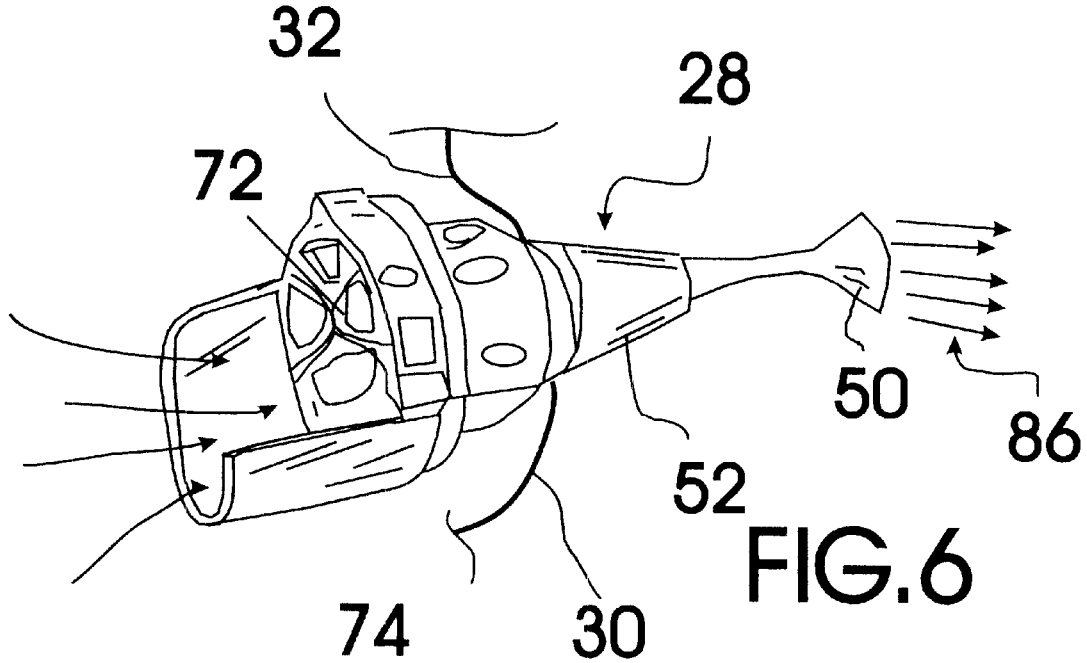

ANTI-HYDROPLANE SYSTEM FOR TIRES

TECHNICAL FIELD

The present invention relates to vehicle safety equipment and more particularly to an anti-hydroplane system for the tires of a vehicle that is installable on a vehicle, such as a car, truck, airplane, trailer etc, that includes a system control unit; an on/off switch; an air compressor unit; a melting solution heater/reservoir tank; a compressed air storage tank; a number of heater/blower assemblies; interconnecting tubing for connecting the melting solution heater/reservoir tank and the compressed air storage tank to each of the heater/blower assemblies; and control/power supply wiring for connecting the control unit to the on/off switch, the air compressor unit, the melting solution heater/reservoir tank, a compressed air control valve connected to the tank outlet of the compressed air storage tank, and each of the heater/blower assemblies.

BACKGROUND ART

In rainy, snowy, icy weather, the accumulation of water on a roadway can cause the vehicle tires to temporarily slide on top of the roadway water surface a condition known as hydroplaning. When a tire is hydroplaning, it is not in contact with the road and, therefore, the driver cannot steer the vehicle by turning the tires. Each year thousands of vehicle accidents occur when the vehicle tires hydroplane. It would be a benefit, therefore, to have an anti-hydroplane system for tires that would include a blower assembly in front of each of the tires of the vehicle which would discharge a high pressure stream in front of each of the tires that would disperse water and prevent the accumulation of road water, ice and/or snow that must occur between the road and the tire treads before hydroplaning can take place.

GENERAL SUMMARY DISCUSSION OF INVENTION

It is thus an object of the invention to provide an anti-hydroplane system for tires that includes a system control unit; an on/off switch; an air compressor unit; a melting solution heater/reservoir tank; a compressed air storage tank; a number of heater/blower assemblies; interconnecting tubing for connecting the melting solution heater/reservoir tank and the compressed air storage tank to each of the heater/blower assemblies; and control/power supply wiring for connecting the control unit to the on/off switch, the air compressor unit, the melting solution heater/reservoir tank, a compressed air control valve connected to the tank outlet of the compressed air storage tank, and each of the heater/blower assemblies.

Accordingly, an anti-hydroplane system for tires is provided. The an anti-hydroplane system for tires includes a system control unit; an on/off switch; an air compressor unit; a melting solution heater/reservoir tank; a compressed air storage tank; a number of heater/blower assemblies; interconnecting tubing for connecting the melting solution heater/reservoir tank and the compressed air storage tank to each of the heater/blower assemblies; and control/power supply wiring for connecting the control unit to the on/off switch, the air compressor unit, the melting solution heater/reservoir tank, a compressed air control valve connected to the tank outlet of the compressed air storage tank, and each of the heater/blower assemblies.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein:

FIG. 3 is a perspective view of the air compressor unit of the anti-hydroplane system for tires in isolation.

FIG. 4 is a perspective view of the melting solution heater/reservoir tank of the anti-hydroplane system for tires in isolation.

FIG. 5 is a perspective view of the compressed air storage tank of the anti-hydroplane system for tires in isolation.

FIG. 6 is a perspective view of one of the four heater/blower assemblies of the anti-hydroplane system for tires in isolation.

EXEMPLARY MODE FOR CARRYING OUT THE INVENTION

Figure 1:
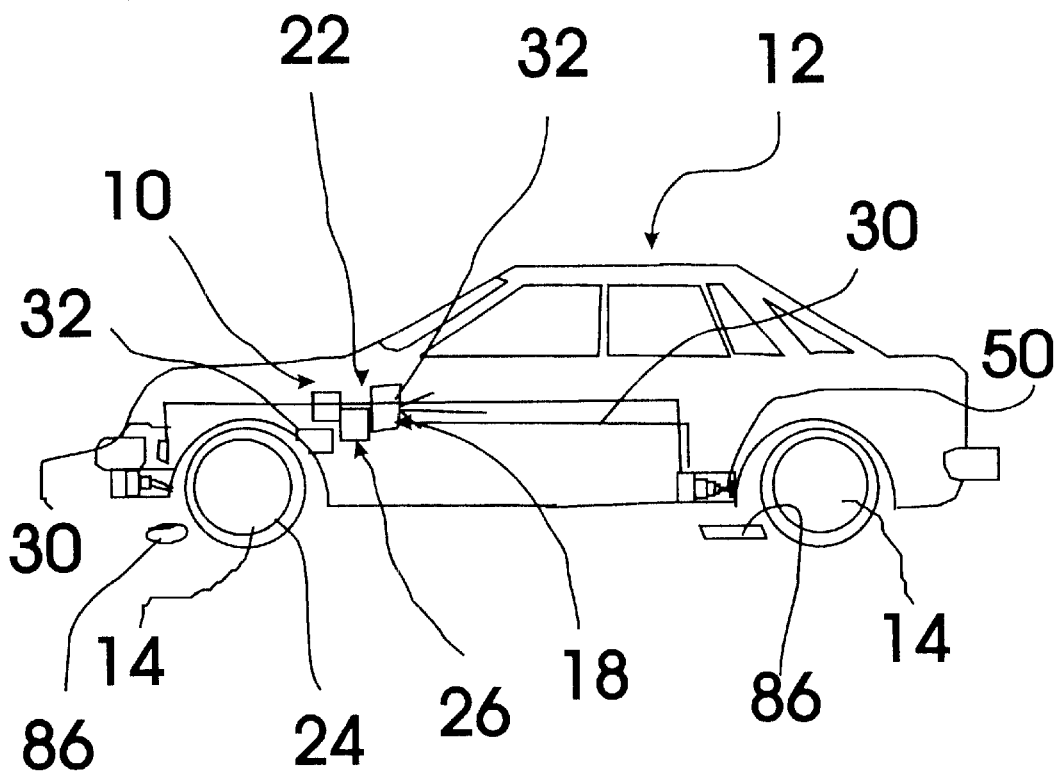
FIG. 1 is a side, partial cutaway view of a representative automobile having an exemplary embodiment of the anti-hydroplane system for tires of the present invention.
Figure 2:
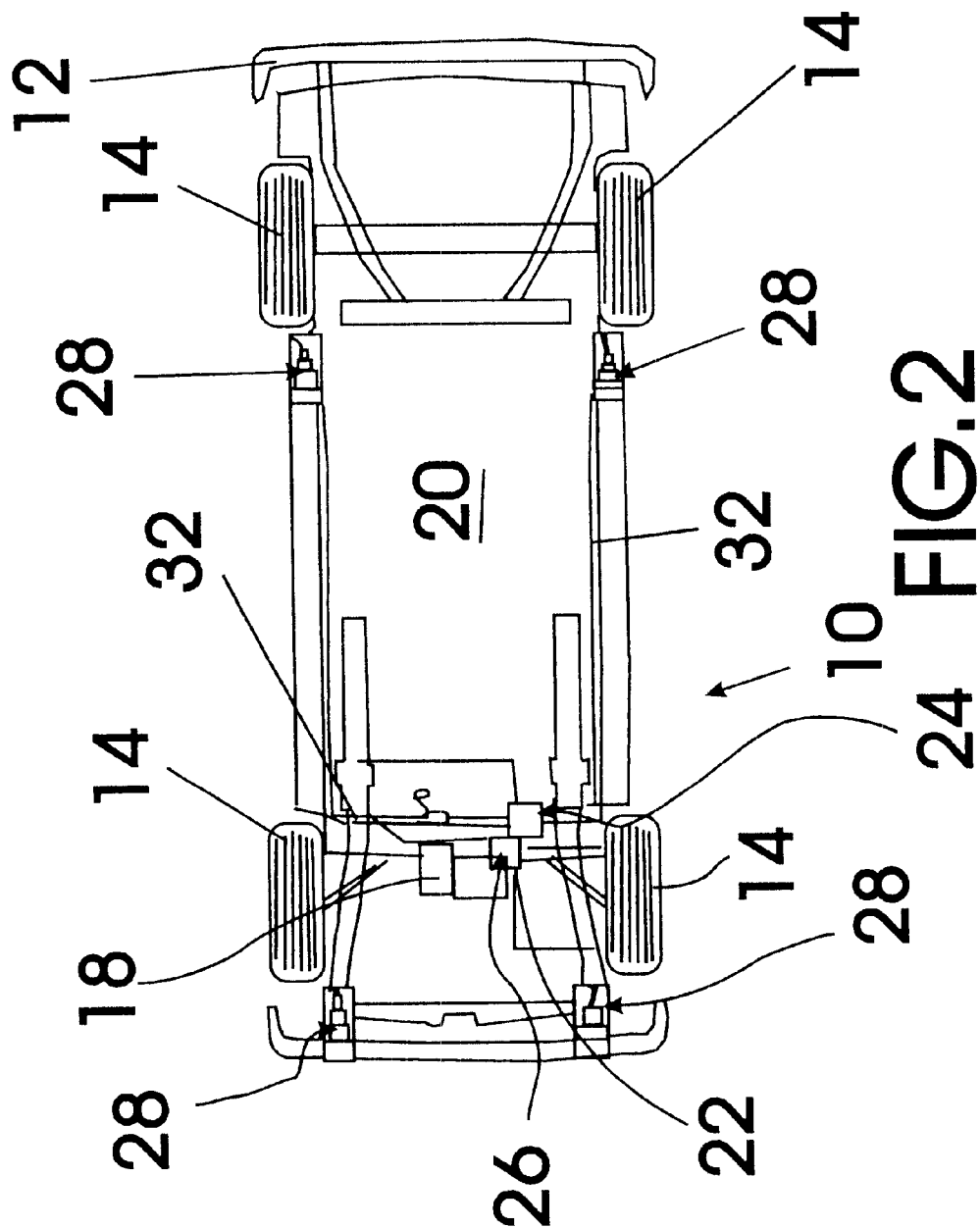
FIG. 2 is an underside, plan view of the anti-hydroplane system for tires installed on a representative automobile showing the system control unit, the on/off switch, the air compressor unit, the melting solution heater/reservoir tank, the compressed air storage tank, four heater/blower assemblies, and interconnecting tubing and control/power supply wiring.
Figure 7:
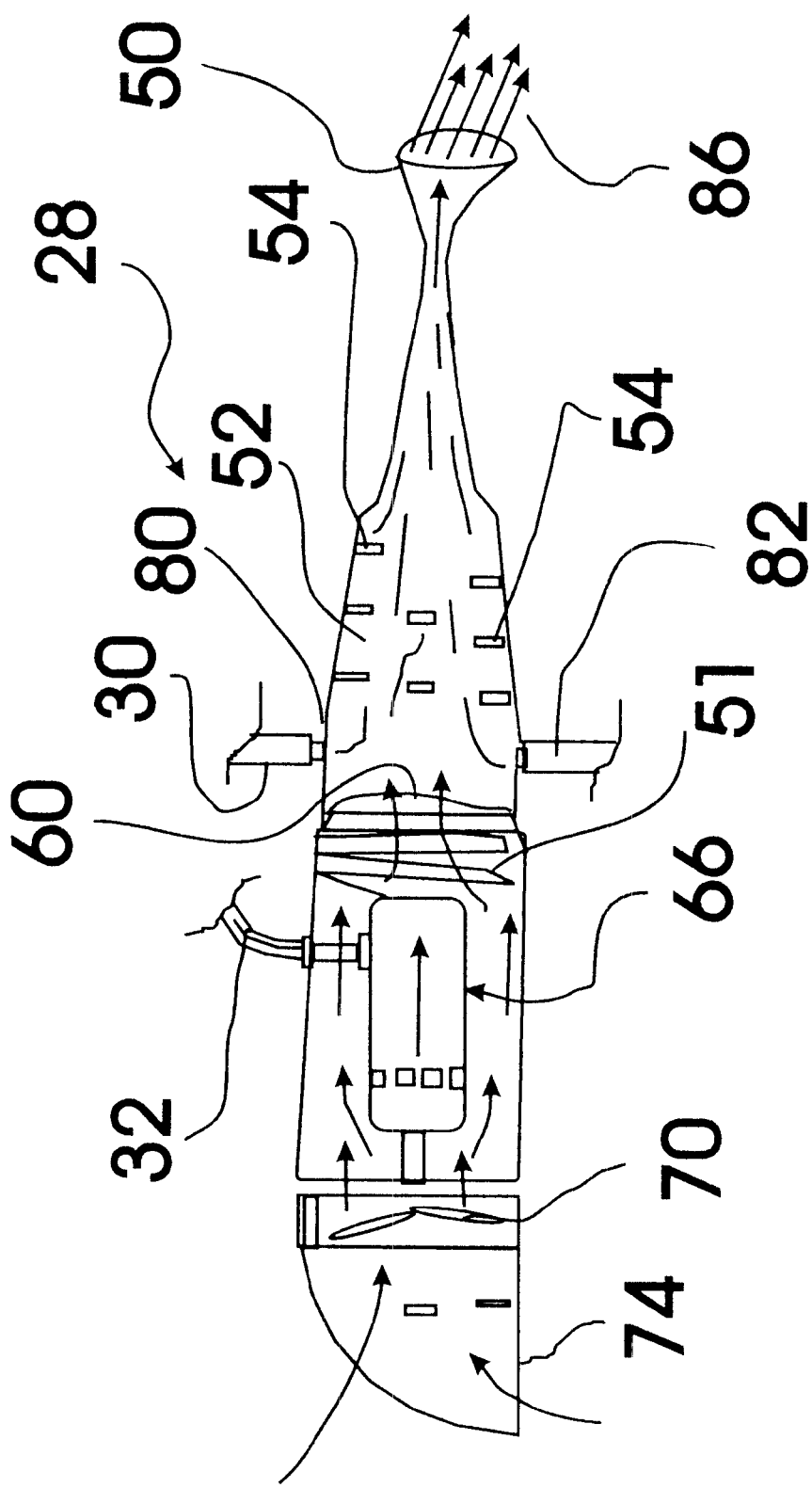
FIG. 7 is a side, cutaway view of one of the four heater/blower assemblies of the anti-hydroplane system for tires in isolation showing the air intake opening, the air heater coil, the compressed air inlet, the melting solution inlet, the air/solution mixing fins and the high speed air/solution discharge nozzle.

FIGS. 1–7 show various aspects of an exemplary embodiment of the anti-hydroplane system for tires of the present invention, generally designated 10, installed on a representative vehicle, generally designated 12, having four tires 14.

Anti-hydroplane system for tires 10 includes a system control unit, generally designated 18; an on/off switch 20; an air compressor unit, generally designated 22; a melting solution heater/reservoir tank, generally designated 24; a compressed air storage tank, generally designated 26; four heater/blower assemblies, each generally designated 28; interconnecting tubing sections 30 and control/power supply wiring 32. Interconnecting tubing sections 30 are for connecting melting solution heater/reservoir tank 24 and compressed air storage tank 26 to each of the heater/blower assemblies 28. Control/power supply wiring 32 is used for connecting the control unit 18 to the on/off switch 20, the air compressor unit 22, the melting solution heater/reservoir tank 26, an electrically controlled, compressed air control valve 40 connected to the tank outlet 42 of compressed air storage tank 26; an electrically controlled, reservoir control valve 44 having an electrical reservoir valve control input 46, a reservoir resistance heating element 47 and the sealed electrical blower motor 49 and the blower resistance heater element 51 of each of the heater/blower assemblies 28. Each of the heater/blower assemblies includes a blower mechanism, generally designated 66, that includes sealed electrical blower motor 49, fan blades 70 coupled to an output shaft of the blower motor 49, a blower air output 60, a blower air intake 72 and a water deflection intake shield 74.

Each of the heater/blower assemblies 28 includes a high pressure stream output nozzle 50 in connection with a mixing chamber 52. Mixing chamber 52 has a number of mixing fins 54 provided therein. Mixing chamber 52 is also in connection with the blower air output 60, a compressed air inlet fitting 80, and a liquid inlet fitting 82.

Operation of the air compressor unit 22, the tank resistance heating element 47, the sealed electrical blower motor 49 and the blower resistance heater element 51 of each of the heater/blower assemblies 28, while the electrically controlled, compressed air control valve 40 and the electrically controlled, reservoir control valve 44 are in the open position causes each of the heater blower assemblies 28 to generate a high pressure stream 86 of mixed, heated air and liquid that is directed out of the pressure stream output nozzle 50 of the respective heater/blower assembly 28 toward a water dispersing area 86 directly in front of a respective vehicle tire 14 causing any accumulated water, ice, snow or other liquids to be dispersed before the tire 14 can hydroplane.

It can be seen from the preceding description that an anti-hydroplane system for tires has been provided.

It is noted that the embodiment of the anti-hydroplane system for tires described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. In a vehicle having a number of tires, an engine driving the tires, and a vehicle electrical system powered by the engine, an improvement comprising:

an anti-hydroplane system carried on the vehicle, the anti-hydroplane system comprising:
a system control unit;
an on/off switch;
an air compressor unit;
a melting solution heater/reservoir tank having a reservoir resistance heating element and a reservoir cavity filled with a quantity of a heatable liquid, the reservoir cavity having a reservoir outlet fitting in connection therewith;
an electrically controlled, reservoir control valve having an electrical reservoir valve control input and installed in liquid flow controlling connection with the reservoir outlet fitting of the melting solution heater/reservoir tank;
a compressed air storage tank having an air inlet and an air outlet fitting;
an electrically controlled, compressed air control valve having an electrical air tank control input and installed in air flow controlling connection with the air outlet fitting of the compressed air storage tank;
a number of heater/blower assemblies, one installed in front of each of the number of tires of the vehicle and having a high pressure stream output nozzle in connection with a mixing chamber, the mixing chamber having a number of mixing fins provided therein; the mixing chamber being in connection with a blower output of an included blower mechanism, a compressed air inlet fitting, and a liquid inlet fitting;
interconnecting tubing connecting the outlet side of the electrically controlled, reservoir control valve to the liquid inlet fitting of each of the heater/blower assemblies and the outlet side of the electrically controlled, compressed air control valve to the compressed air inlet fitting of each of the heater/blower assemblies; and
control/power supply wiring connecting the control unit to the on/off switch, the air compressor unit, the tank resistance heating element of the melting solution heater/reservoir tank, the electrical reservoir valve control input, the electrical control input of the compressed air control valve connected to the tank outlet of the compressed air storage tank, and a sealed electrical blower motor and a blower resistance heater element of each of the heater/blower assemblies;
the control unit turning on the air compressor unit, turning on the tank resistance heating element, turning on the sealed electrical blower motor and the blower resistance heater element of each of the heater/blower assemblies, and opening the electrically controlled, compressed air control valve and the electrically controlled, reservoir control valve in response to a user placing the on/off switch into an "on" position;
operation of the air compressor unit, the tank resistance heating element, the sealed electrical blower motor and the blower resistance heater element of each of the heater/blower assemblies, while the electrically controlled, compressed air control valve and the electrically controlled, reservoir control valve are in the open position causes each of the heater blower assemblies to generate a high pressure stream of mixed, heated air and liquid that is directed out of the pressure stream output nozzle of the respective heater/blower assembly toward a water dispersing area directly in front of a respective vehicle tire.

* * * * *